(12) United States Patent
Cottuli et al.

(10) Patent No.: US 8,716,602 B2
(45) Date of Patent: May 6, 2014

(54) CABLE GROMMET FOR USE WITH A RAISED FLOOR

(75) Inventors: Carl Cottuli, Franklin, MA (US); Manuel D. Linhares, Jr., Coventry, RI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/286,360

(22) Filed: Nov. 1, 2011

(65) Prior Publication Data

US 2012/0279779 A1 Nov. 8, 2012

Related U.S. Application Data

(60) Provisional application No. 61/408,794, filed on Nov. 1, 2010.

(51) Int. Cl.
*H01B 17/26* (2006.01)

(52) U.S. Cl.
USPC .................. 174/153 G; 174/152 G; 174/151; 248/56; 439/501

(58) Field of Classification Search
USPC .............. 174/152 G, 153 G, 151; 16/2.1, 2.2; 248/56; 439/501, 453, 921
See application file for complete search history.

(56) References Cited

U.S. PATENT DOCUMENTS

| | | | |
|---|---|---|---|
| 5,101,079 A | 3/1992 | Rodrigues et al. | |
| 5,994,644 A | 11/1999 | Rindoks et al. | |
| 6,278,061 B1 | 8/2001 | Daoud | |
| 6,632,999 B2 | 10/2003 | Sempliner et al. | |
| D571,641 S | 6/2008 | Sempliner et al. | |
| D579,762 S | 11/2008 | Sempliner et al. | |
| 7,507,912 B1 * | 3/2009 | Sempliner et al. | 174/153 G |
| D597,823 S | 8/2009 | Sempliner et al. | |
| RE41,863 E * | 10/2010 | Sempliner et al. | 174/650 |
| 8,049,109 B2 * | 11/2011 | Sempliner et al. | 174/153 G |
| 2010/0004502 A1 | 1/2010 | Honma et al. | |

OTHER PUBLICATIONS

International Search Report and Written Opinion of the International Searching Authority issued in corresponding PCT application No. PCT/US2011/058732 mailed Mar. 19, 2012.

* cited by examiner

*Primary Examiner* — Dhirubhai R Patel
(74) *Attorney, Agent, or Firm* — Kriegsman & Kriegsman

(57) ABSTRACT

Cable grommets for use with raised-floor tiles permit the passage of cables while simultaneously limiting the amount of cool air escaping from under-floor ducts and plenums. The cable grommet includes a floor tile mounting flange, one or more pairs of opposed, overlapping finger assemblies, and one or more pairs of opposed finger mounting flanges for coupling the finger assemblies to the underside of the floor tile mounting flange. The edges of the of the triangularly-shaped fingers are configured to flex around the cables while the interior core section remains generally rigid and parallel to the plane of the floor to restrict the loss of cooling air. Alternatively, the cable grommet includes a floor tile mounting flange and a finger panel defining a sinusoidal cut along its length and a plurality of intersecting short cuts.

18 Claims, 17 Drawing Sheets

CABLE GROMMET FOR USE WITH A RAISED FLOOR

CROSS-REFERENCE TO RELATED APPLICATION

This application claims priority to U.S. Provisional Patent Application Ser. No. 61/408,794, entitled "Cable Grommet for Use with a Raised Floor," filed on Nov. 1, 2010. The entire contents of the priority application are expressly incorporated by reference herein.

FIELD OF THE INVENTION

The invention relates generally to a cable grommet for use with a raised floor.

BACKGROUND OF THE INVENTION

Cooling air is often supplied to data centers and offices via ducts or plenums located under a raised floor. These same under-floor ducts or plenums may also be used for the passage of power and data cables, and openings are often provided in the raised floors to route these cables to the electrical equipment located above the floor. Unfortunately, these openings in the raised floor also allow cooling air to escape, which reduces the overall cooling efficiency of the data center or office. There is a need in the art for devices that can be mounted within a standard floor tile to accommodate the routing of cables while simultaneously restricting the loss of cooling air.

SUMMARY OF THE INVENTION

The invention disclosed herein provides cable grommets for use with prior art raised-floor systems. In preferred embodiments, the cable grommets of the invention are configured to be mounted within a standard-size opening in a raised floor tile. The cable grommets permit the passage of cables through the opening in the raised floor tile while simultaneously limiting the amount of cooling air escaping through these openings.

In a preferred embodiment, the cable grommet comprises a floor tile mounting flange, one or more pairs of opposed, overlapping molded finger assemblies, and one or more pairs of opposed molded finger mounting flanges for coupling the molded finger assemblies to the underside of the floor tile mounting flange.

The floor tile mounting flange may define a perimeter frame that is sized and shaped such that at least a portion of the perimeter frame rests along the top surface of a floor tile. The floor tile mounting flange may further define an opening to accommodate the passage of cables. The floor tile mounting flange may be a one-piece construction or a two-piece construction, the latter being better suited for retrofit applications where the floor tile is not removable or where under-floor access is limited.

The molded finger assemblies may each comprise a plurality of triangular-shaped fingers or tangs, each finger having a base, a tip, an inner core that may be formed from a rigid polymer, and an outer edge or wing section that may be formed from a less rigid polymer. The edges or wings of the molded fingers may be configured to flex around the cables while the core section remains generally rigid and lies generally in a plane that is essentially parallel to the plane of the floor, to restrict the loss of cooling air. The molded finger assemblies may be mounted on opposite sides of the floor tile mounting flange such that the molded fingers may extend across at least the majority of the opening in the floor tile mounting flange and the two sets of molded fingers may overlap to provide a more efficient air barrier. More than one pair of molded finger assemblies may be used to further reduce the amount of cool air leakage.

In another preferred embodiment, the cable grommet comprises a floor tile mounting flange, one or more die-cut finger panels, and optionally, one or more pairs of finger panel spacers.

The floor tile mounting flange may define a perimeter frame that is sized and shaped such that at least a portion of the perimeter frame rest along the top surface of a floor tile. The floor tile mounting flange may further define an opening to accommodate the passage of cables. The floor tile mounting flange may be a one-piece construction or a two-piece construction, the latter being better suited for retrofit applications where the floor tile is not removable or where under-floor access is limited.

The finger panel may define a sinusoidal cut along its length and width, and the sinusoidal cut may extend through the thickness of the finger panel. The finger panel may also define a number of short cuts that may intersect and run generally perpendicular to the sinusoidal cut. The combination of the sinusoidal cut and the short cuts may create openings for the cables to pass though. The edges of the cuts may form a plurality of fingers that bend around the cable, while the surrounding surface of the finger panel may remain generally rigid and lie generally in a plane that is essentially parallel to the plane of the floor, to restrict the escape of cooling air.

In a preferred embodiment, the invention provides a cable grommet comprising a mounting flange including a perimeter frame, where the perimeter frame may define an opening; first and second finger assemblies, where each finger assembly may comprise a plurality of fingers, and each finger may comprise a base portion and a tip portion; and first and second finger mounting flanges; where the first finger mounting flange is preferably coupled to the first finger assembly and further preferably coupled to a first side of the perimeter frame; and where the second finger mounting flange is preferably coupled to the second finger assembly and further preferably coupled to an opposing second side of the perimeter frame; such that the tip portions of the fingers in the first finger assembly may extend across at least the majority of the opening toward the base portions of the fingers in the second finger assembly, and the tip portions of the fingers in the second finger assembly may extend across at least the majority of the opening toward the base portions of the fingers in the first finger assembly.

In an aspect, the mounting flange may comprise two approximately symmetrical halves. In another aspect, a plurality of the fingers may define a generally triangular shape when viewed from the front. In yet another aspect, a plurality of the fingers may define an inner section and a pair of outer sections, where the outer sections may together surround at least a part of the inner section. In still another aspect, a hardness value of the inner section may be greater than the hardness value of the outer sections.

In an aspect, the cross-sectional area of the inner section may be smallest proximate the tip portion and largest proximate the base portion. In another aspect, the cross-sectional area of the outer section may be largest proximate the tip portion and smallest proximate the base portion.

In an aspect, the fingers in each of the finger assemblies may be coupled at their base portions to an elongated support rib. In another aspect, each finger mounting flange may define an elongated mounting channel sized and shaped to accommodate the elongated support rib.

In another preferred embodiment, the invention provides a cable grommet comprising third and fourth finger assemblies; and third and fourth finger mounting flanges; where the third finger mounting flange may be coupled to the third finger assembly and may further coupled to the first finger mounting flange; and where the fourth finger mounting flange may be coupled to the fourth finger assembly and may further coupled to the second finger mounting flange; such that the tip portions of the fingers in the third finger assembly may extend across at least the majority of the opening toward the base portions of the fingers in the fourth finger assembly, and the tip portions of the fingers in the fourth finger assembly may extend across at least the majority of the opening toward the base portions of the fingers in the third finger assembly.

In an additional preferred embodiment, the invention provides a floor grommet, comprising a mounting flange defining a perimeter frame and an opening; and a finger panel coupled to the mounting flange, the finger panel preferably extending across at least the majority of the opening; and where the finger panel may define a generally sinusoidal cut along its length, and where the sinusoidal cut may extend through the thickness of the finger panel.

In an aspect, the sinusoidal cut may extend across at least the majority of the width of the finger panel. In another aspect, the finger panel may further define a plurality of short cuts that intersect with and run generally perpendicular to the sinusoidal cut, and at least a majority of the short cuts may extend through the thickness of the finger panel.

In an aspect, the cable grommet may comprise a second finger panel and a pair of finger panel spacers, where the first finger panel may be coupled to a first side of each of the finger panel spacers and the second finger panel may be coupled to an opposing second side of each finger panel spacer. In another aspect, the sinusoidal cut may extend across at least the majority of the width of the finger panel. In still another aspect, the sinusoidal cut may extend across at least the majority of the width of the finger panel. In another aspect, the sinusoidal cut may extend across at least the majority of the width of the finger panel.

In an aspect, the cable grommet may comprise a second finger panel and a pair of finger panel spacers, where the first finger panel may be coupled to a first side of each of the finger panel spacers and the second finger panel may be coupled to an opposing second side of each finger panel spacer. In another aspect, the mounting flange may comprise two approximately symmetrical halves.

In an additional preferred embodiment, the invention provides an assembly for use in a cable grommet, comprising an elongated support rib; a plurality of fingers, where at least a majority of the fingers may each comprise a base portion and a tip portion, and may be coupled to the elongated support rib at their base portions, such that at least the majority of the fingers may extend generally perpendicular to the support rib; where at least the majority of the fingers may each define an inner section and a pair of outer sections, and where the outer sections together may surround at least a part of the inner section.

In an aspect, the cross-sectional area of the inner section may be smallest proximate the tip portion and largest proximate the base portion, and the cross-sectional area of the outer section may be largest proximate the tip portion and smallest proximate the base portion.

In an additional preferred embodiment, the invention provides a panel for use in a floor grommet, comprising a first generally rectangular panel defining a generally sinusoidal cut along its length, where the sinusoidal cut may extend through the thickness of the panel, and further defining a plurality of short cuts that may intersect with and run generally perpendicular to the sinusoidal cut, where at least a majority of the short cuts may extend through the thickness of the finger panel.

In an aspect, the cable grommet may further comprise a second generally rectangular panel coupled to the first panel.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS OF THE INVENTION

Figure 1:
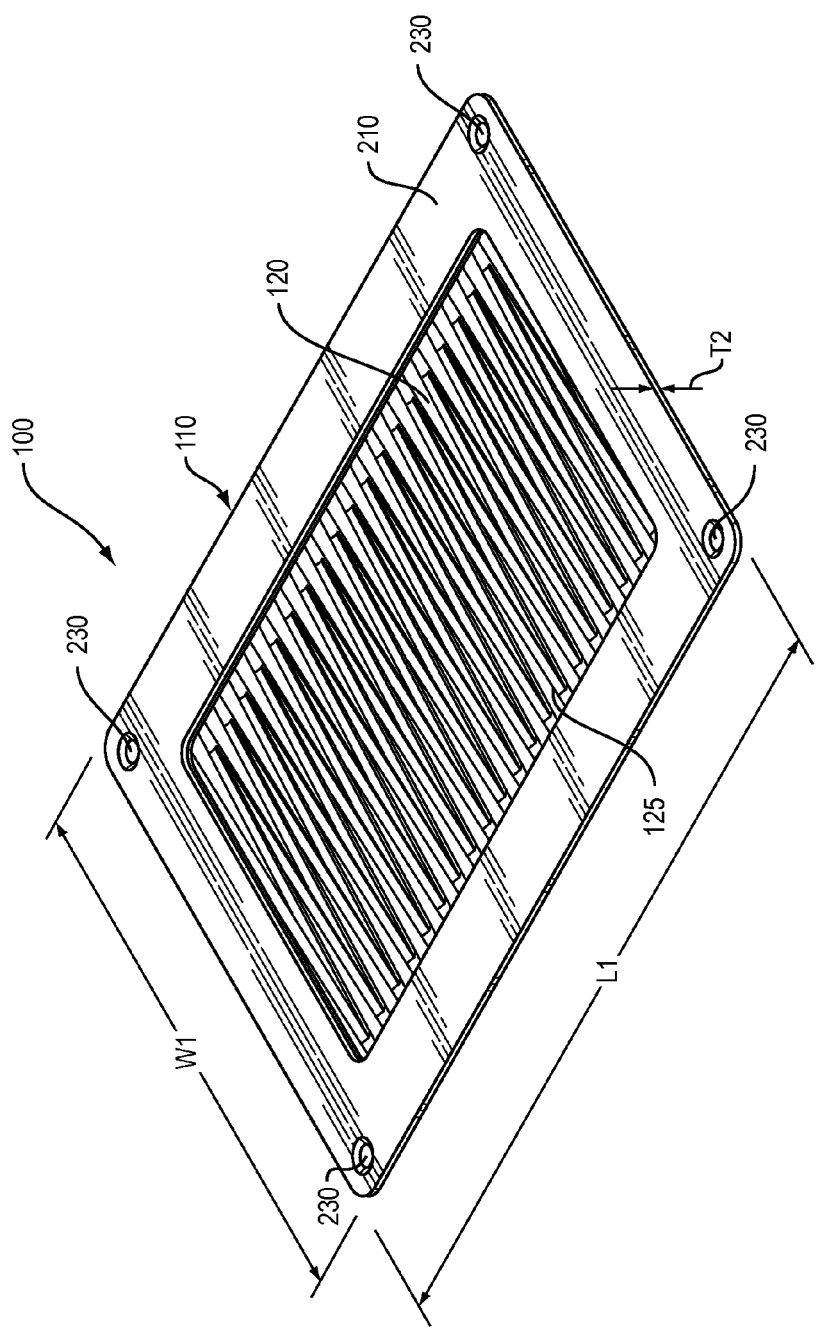
FIG. 1 is a top perspective view of a preferred embodiment of a cable grommet for use with a raised floor, constructed in accordance with the invention.
Figure 2A:
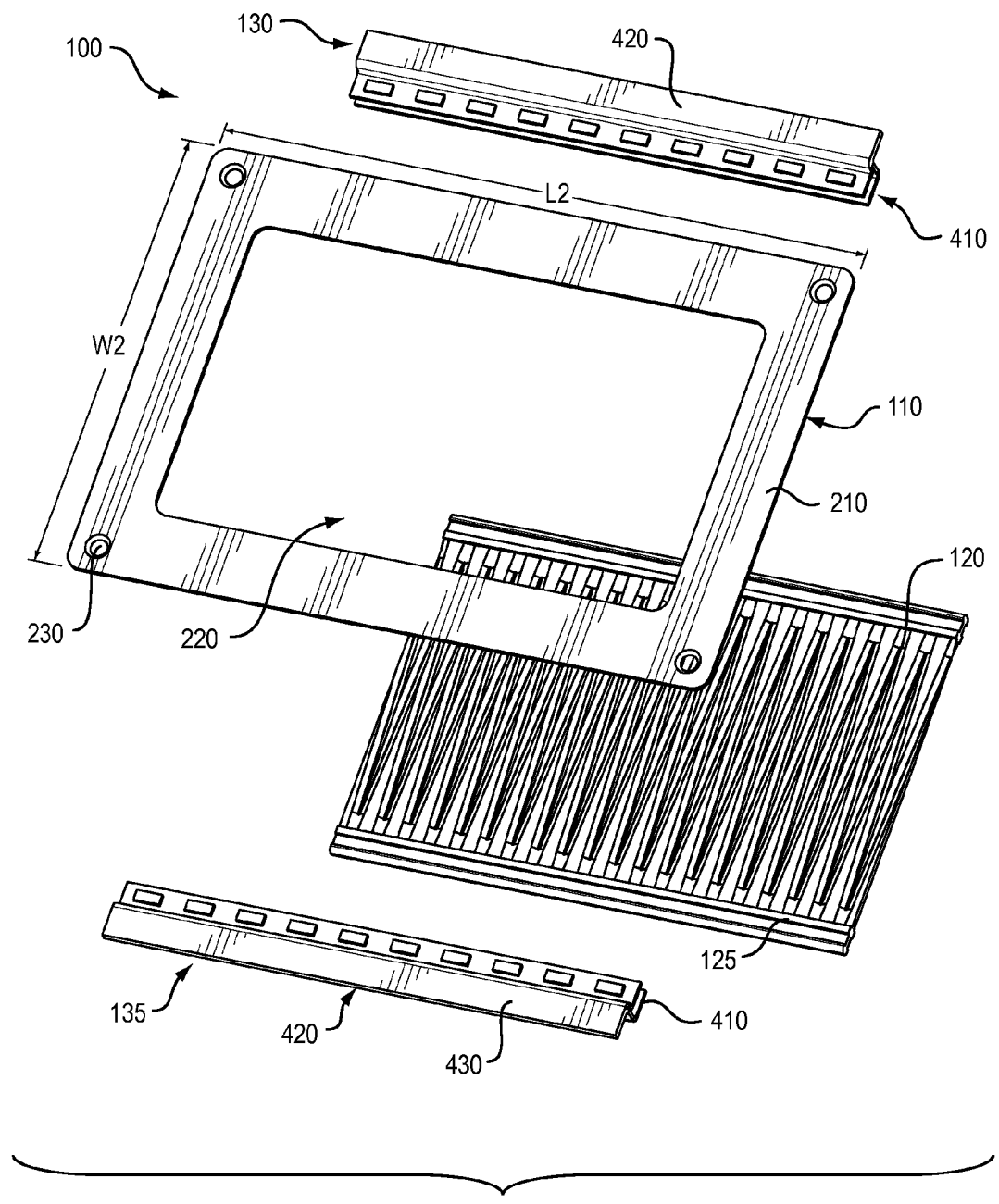
FIG. 2A is an exploded view of the cable grommet of FIG. 1.

With reference to FIGS. 1 and 2A, in a preferred embodiment, cable grommet 100 comprises a floor tile mounting flange 110, at least one pair of opposed, overlapping molded finger assemblies 120 and 125, and at least one pair of opposed molded finger mounting flanges 130 and 135.

In a preferred embodiment, cable grommet 100 is configured to be used with a standard two-foot square raised floor tile, as described in detail below. In this configuration, cable grommet 100 has an approximate length L1 of 10.75 inches (27.3 centimeters) and an approximate width W1 of 8.25 inches (21 centimeters). The thickness or depth of cable grommet 100 is dependent upon the number of pairs of opposed, overlapping molded finger assemblies employed in any specific configuration, as described in detail below. Note that the invention is not limited to any particular type or size of raised floor tile system.

Floor tile mounting flange 110 defines a generally rectangular perimeter frame 210, a generally rectangular center opening 220, and optionally, one or more floor tile flange mounting holes 230. In a preferred embodiment, for use with a standard two-foot square raised floor tile, floor tile mounting flange 110 has the same approximate length L2 and same approximate width W2 as length L1 and width W1, respectively, of cable grommet 100, and perimeter frame 210 has an approximate thickness T2 of 0.60 inches (1.5 centimeters). Perimeter frame 210 is preferably made of a hard plastic material, such as acrylonitrile-butadiene-styrene (ABS), polyvinyl chloride (PVC), PVC-SBS blends, or metals. Perimeter frame 210 may optionally be treated to be antistatic or flame-retardant.

Figure 2B:
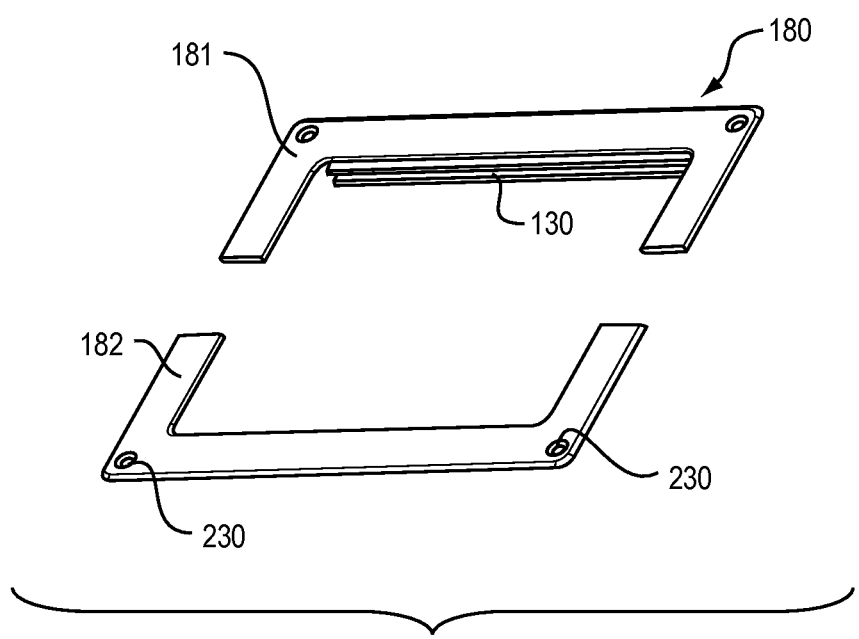
FIG. 2B is an alternative embodiment of the floor tile mounting flange of the cable grommet of FIG. 2A.

With reference to FIG. 2B, in an alternative embodiment for use in a retrofit application where the floor tile is not removable or where under-floor access is limited, floor tile mounting flange 180 may be constructed in two approximately symmetrical halves 181 and 182.

With reference to FIGS. 3A through 3I, and in a preferred embodiment, each molded finger assembly, such as molded finger assembly 120, comprises a plurality of molded fingers or tangs, such as molded finger or tang 320, and a support rib 310.

In a preferred embodiment, each molded finger 320 is generally shaped as an isosceles triangle when viewed from the front, having a base 340, two approximately equal sides 345 and 346, and a tip 370. Preferably, each molded finger 320 has an approximate height of H3 from the base 340 to the tip 370 of 5.5 inches (14 centimeters), a base 340 width W3 of approximately 0.5 inches (1.3 centimeters), an approximate thickness TB3 at the base 340 of 0.125 inches (0.32 centimeters) tapering to an approximate thickness TT3 of 0.0625 inches (0.16 centimeters) at the tip 370.

Figure 3A:
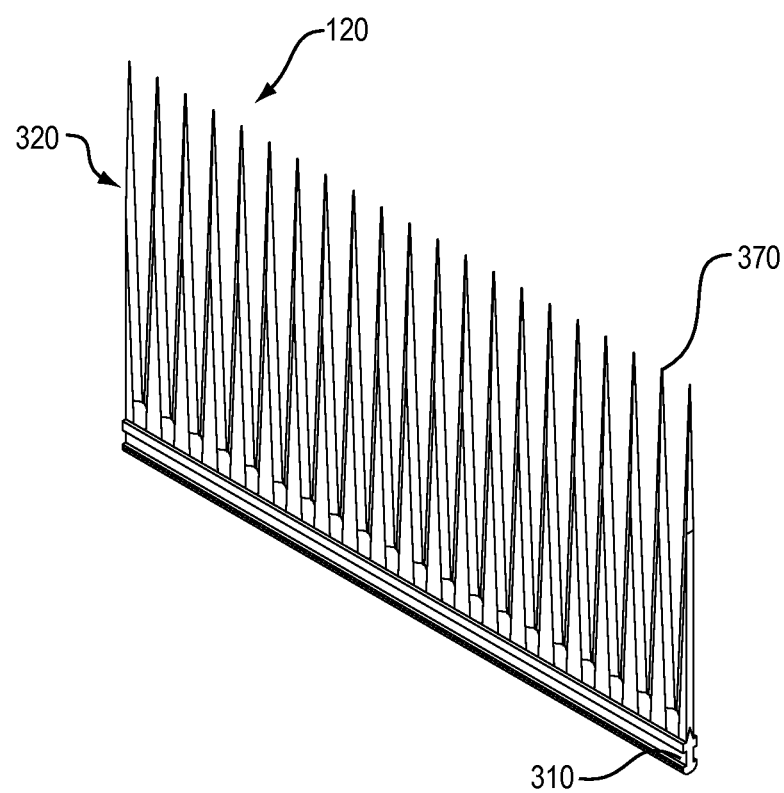
FIG. 3A is perspective view of a molded finger assembly of the cable grommet of FIG. 2A.
Figure 3B:
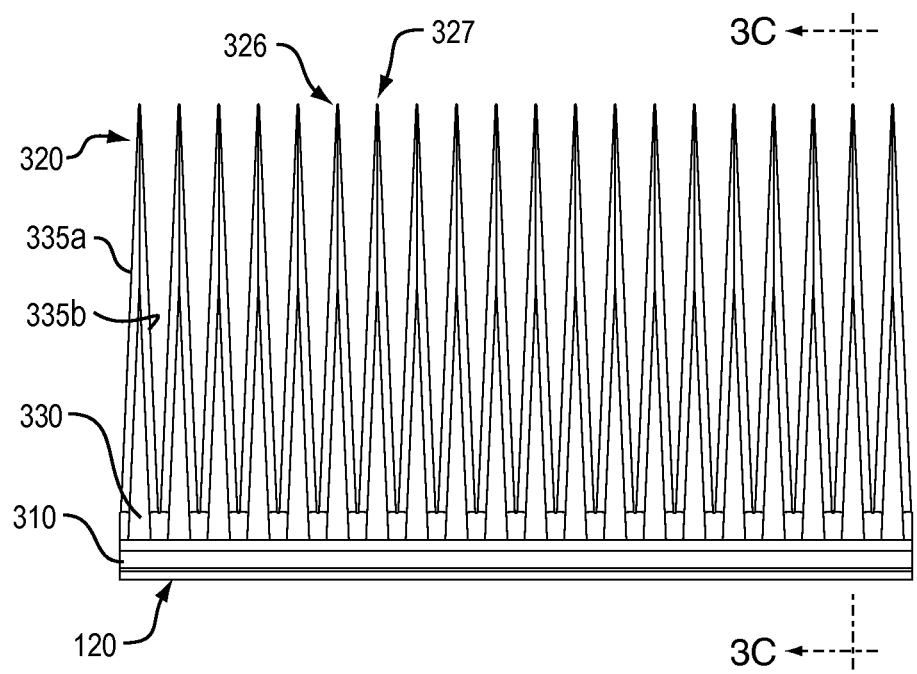
FIG. 3B is a front view of the molded finger assembly of FIG. 3A.
Figure 3C:
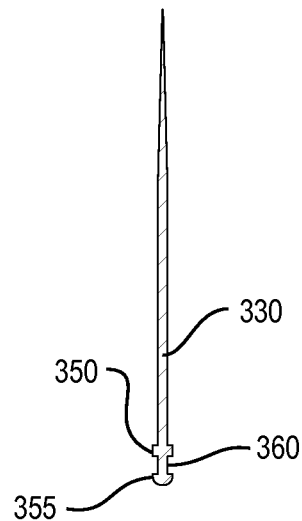
FIG. 3C is a cross-sectional view along lines "3C-3C" of FIG. 3B.
Figure 3D:
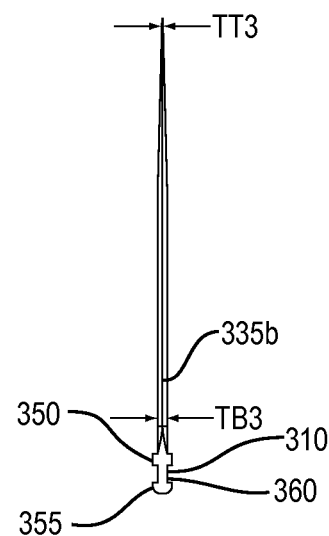
FIG. 3D is a side or edge view of the molded finger assembly of FIG. 3A.
Figure 3E:
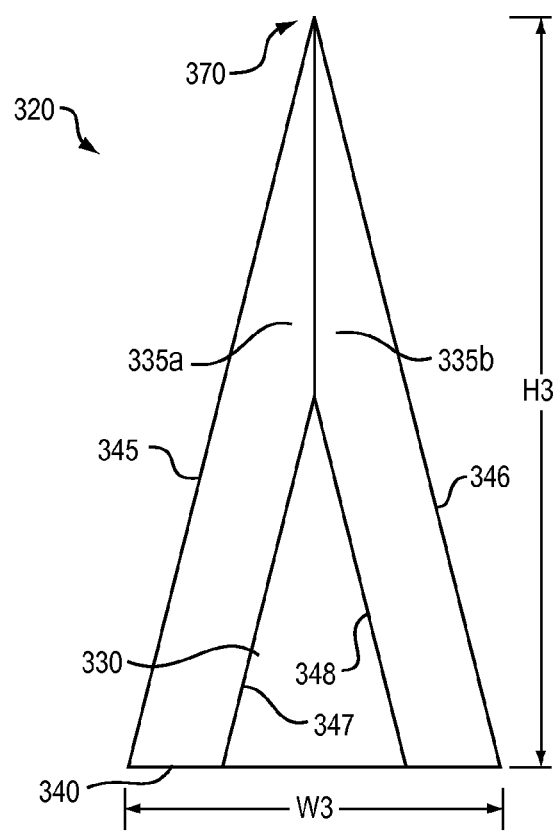
FIG. 3E is a greatly enlarged front view of one molded finger of the molded finger assembly of FIG. 3A.

When viewed from the front, as in FIG. 3E, each molded finger 320 is preferably shaped as an isosceles triangle having two equal sides 345 and 346, and defines an inner core section 330 that is also preferably shaped as an isosceles triangle having two equal sides 347 and 348. Each molded finger 320 further defines outer wing sections 335a and 335b that surround at least a part of sides 347 and 348, respectively, of inner core section 330.

The inner core section 330 is preferably formed from a rigid polymer, such as Santoprene™ with a Durometer rigidity or hardness value of approximately 80 A, while the outer wing sections 335a and 335b are preferably formed from a less rigid polymer, such as Santoprene™ with a Durometer rigidity or hardness value of approximately 60 A. The differences in the rigidity between the inner core section 330 and the outer wing sections 335a and 335b allow the outer wing sections 335a and 335b of each molded finger to more easily flex around the power and data cables inserted through center opening 220 of floor tile mounting flange 110, while the inner core section 330 remains generally rigid and lies generally in a plane that is essentially parallel to the plane of the floor, as described below.

Figure 3F:
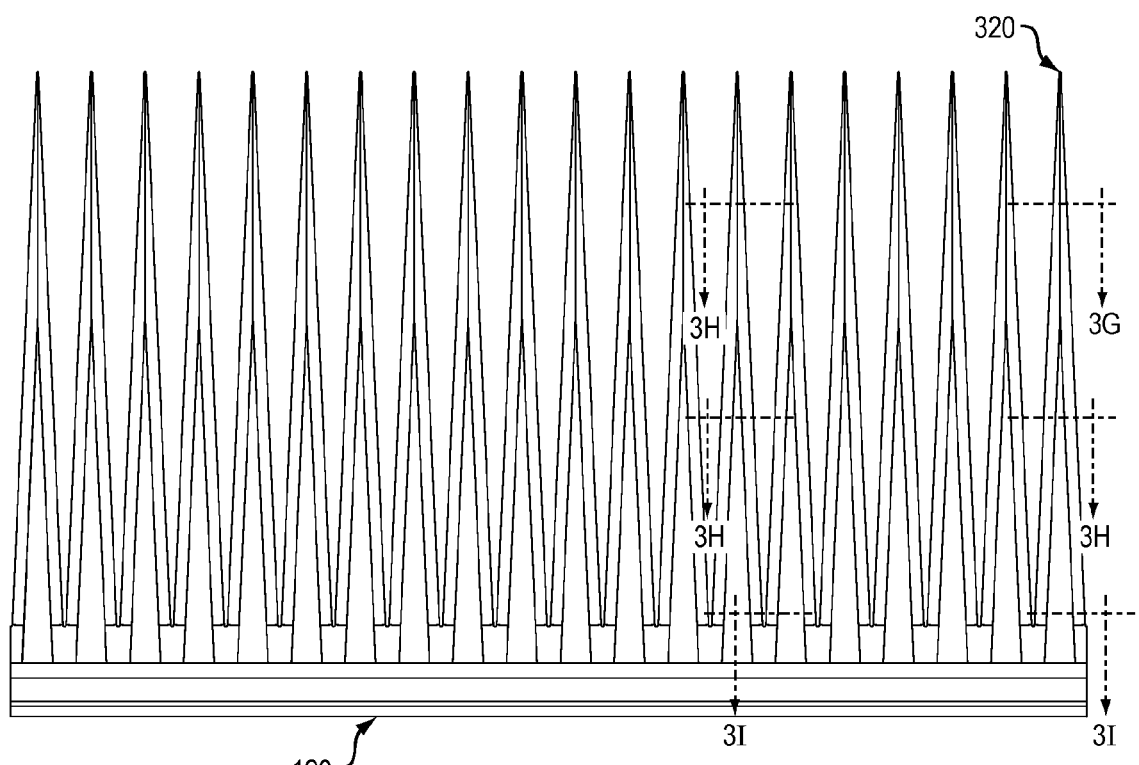
FIG. 3F is a front view of the molded finger assembly of FIG. 3A.
Figure 3G:
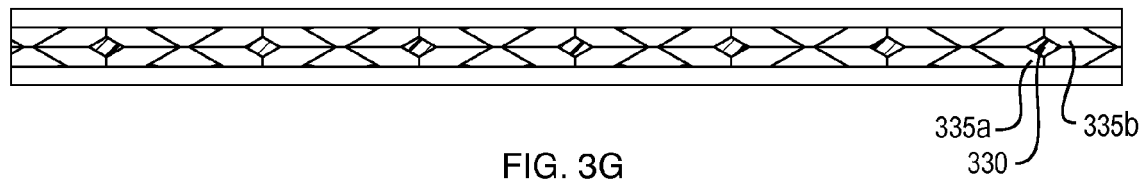
FIG. 3G is a cross-sectional view along lines "3G-3G" of FIG. 3F.
Figure 3H:
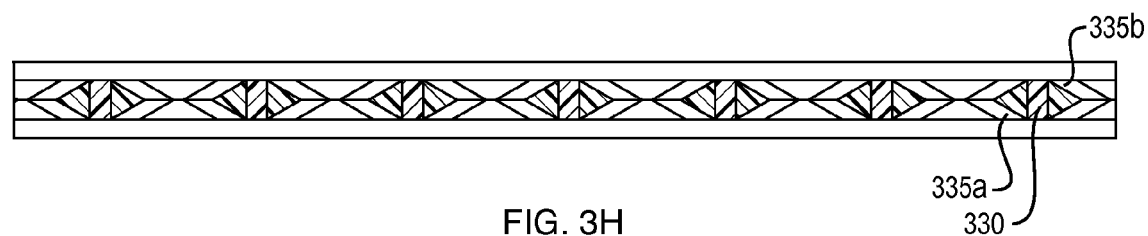
FIG. 3H is a cross-sectional view along lines "3H-3H" of FIG. 3F.
Figure 3I:
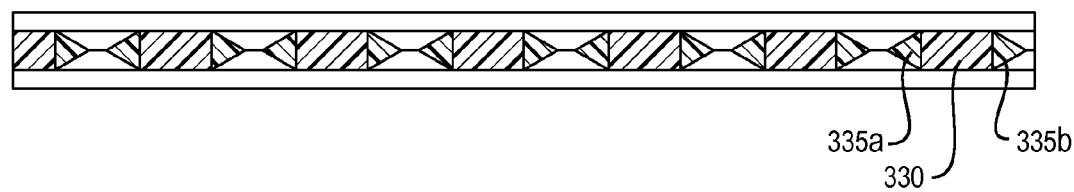
FIG. 3I is a cross-sectional view along lines "3I-3I" of FIG. 3F.

FIGS. 3G, 3H and 3I provide three cross-sectional views of molded finger assembly 120 of FIG. 3F. As shown in FIG. 3I, inner core section 330 of molded finger 320 has a larger cross-sectional area than outer wing sections 335a and 335b at a location closest to base 340. The cross-sectional area of inner core section 330 decreases near the center of the molded finger 320 (FIG. 3H), and the cross-sectional area of inner core section 330 is smallest at a location closest to tip 370 of molded finger 320 (FIG. 3G). Conversely, as shown in FIG. 3G, outer wing sections 335a and 335b have larger cross-sectional areas than inner triangular core section 330 at a location closest to tip 370 of molded finger 320. The cross-sectional areas of outer wing sections 335a and 335b decrease near the center of the molded finger 320 (FIG. 3H), and the cross-sectional areas of outer wing sections 335a and 335b are smallest at a location closest to base 340 (FIG. 3I).

The molded fingers 320 are securely mounted at their base 340 to elongated support rib 310, such that the molded fingers 320 extend generally perpendicular to support rib 310. As shown in FIG. 3B, the molded fingers 320 are preferably closely-packed, such that the base 340 of one molded finger 326 is proximate to and slightly spaced from the base 340 of the next molded finger 327. In alternate embodiments, the base 340 of one molded finger 326 may be adjacent to the base 340 of the next molded finger 327.

When viewed from the side, as shown in FIG. 3D, support rib 310 defines a generally rectangular or semi-circular-shaped top portion 350 and a generally rectangular or semi-circular-shaped bottom portion 355. Top portion 350 and bottom portion 355 are connected by an elongated center section 360. The "dumbbell" shape of the support rib 310 is configured to mount securely within support rib mounting channel 410 of molded finger mounting flanges 130 and 135, as described in detail below. Support rib 310 is preferably made from the same rigid polymer as the inner core section 330. In alternate embodiments, support rib 310 is made from a polymer that is more rigid than inner core section 330. The molded fingers 320 and the support rib 310 may optionally be treated to be anti-static or flame-retardant.

Figure 4:
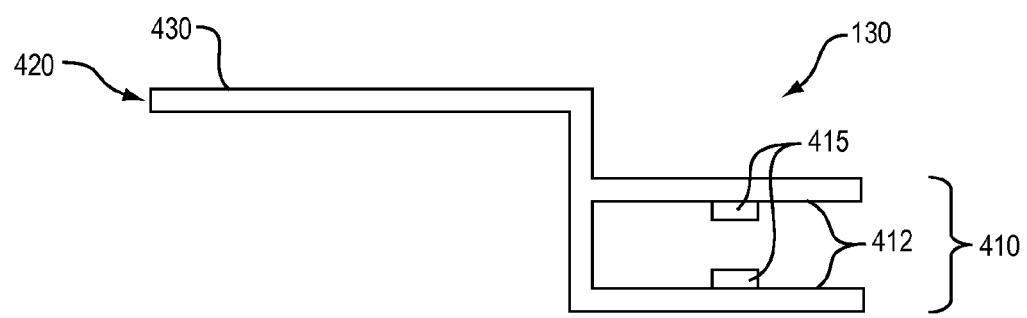
FIG. 4 is a side view of the molded finger mounting flange of the cable grommet of FIG. 2A.

As shown in FIGS. 2A and 4, in a preferred embodiment, molded finger mounting flanges 130 and 135 each define an elongated perimeter frame mounting section 420 and a generally rectangular, elongated support rib mounting channel 410. Perimeter frame mounting section 420 is sized and shaped to mount the molded finger mounting flange 130 to the underside of the perimeter frame 210 of floor tile mounting flange 110.

As shown in FIG. 4, support rib mounting channel 410 is generally "U"-shaped when viewed in cross section, and comprises one or more tabs 415 on each of the interior walls 412 of support rib mounting channel 410. Tabs 415 are configured to accept and securely hold the elongated center section 360 of support rib 310 of one molded finger assembly, such as molded finger assembly 125.

Figure 5:
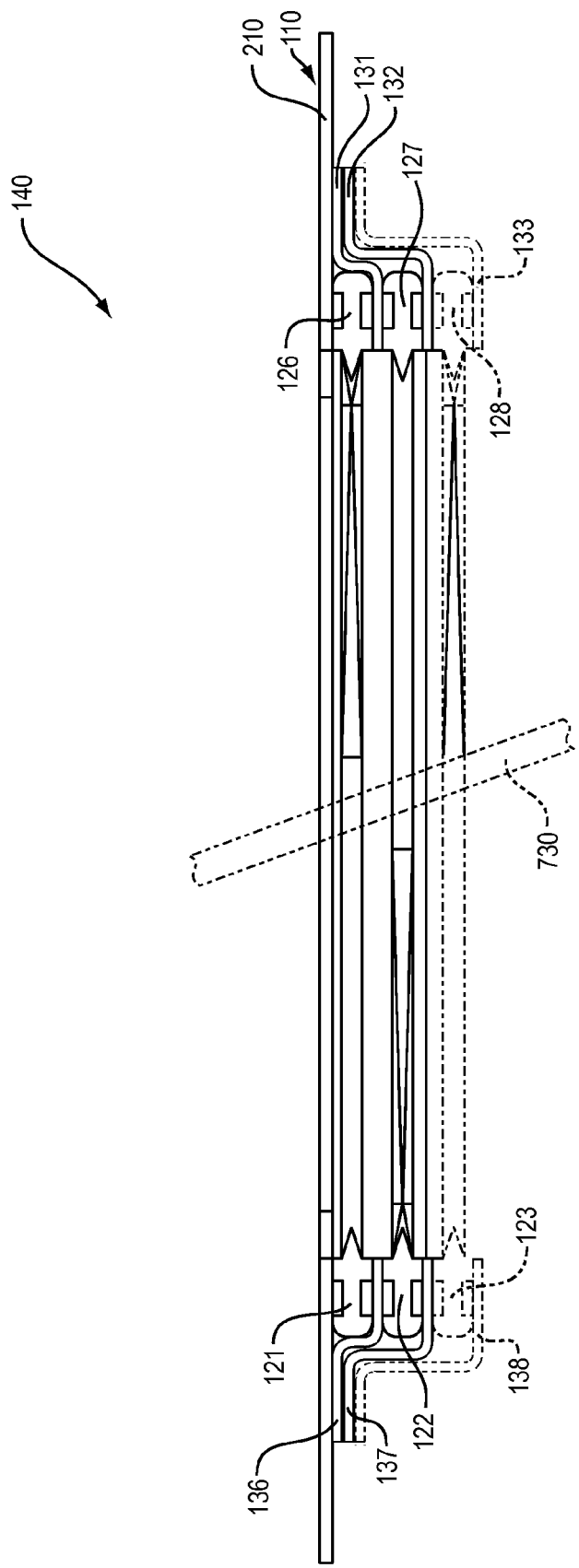
FIG. 5 is a cross-sectional view of a second preferred embodiment of a cable grommet for use with a raised floor, constructed in accordance with the invention.
Figure 6:
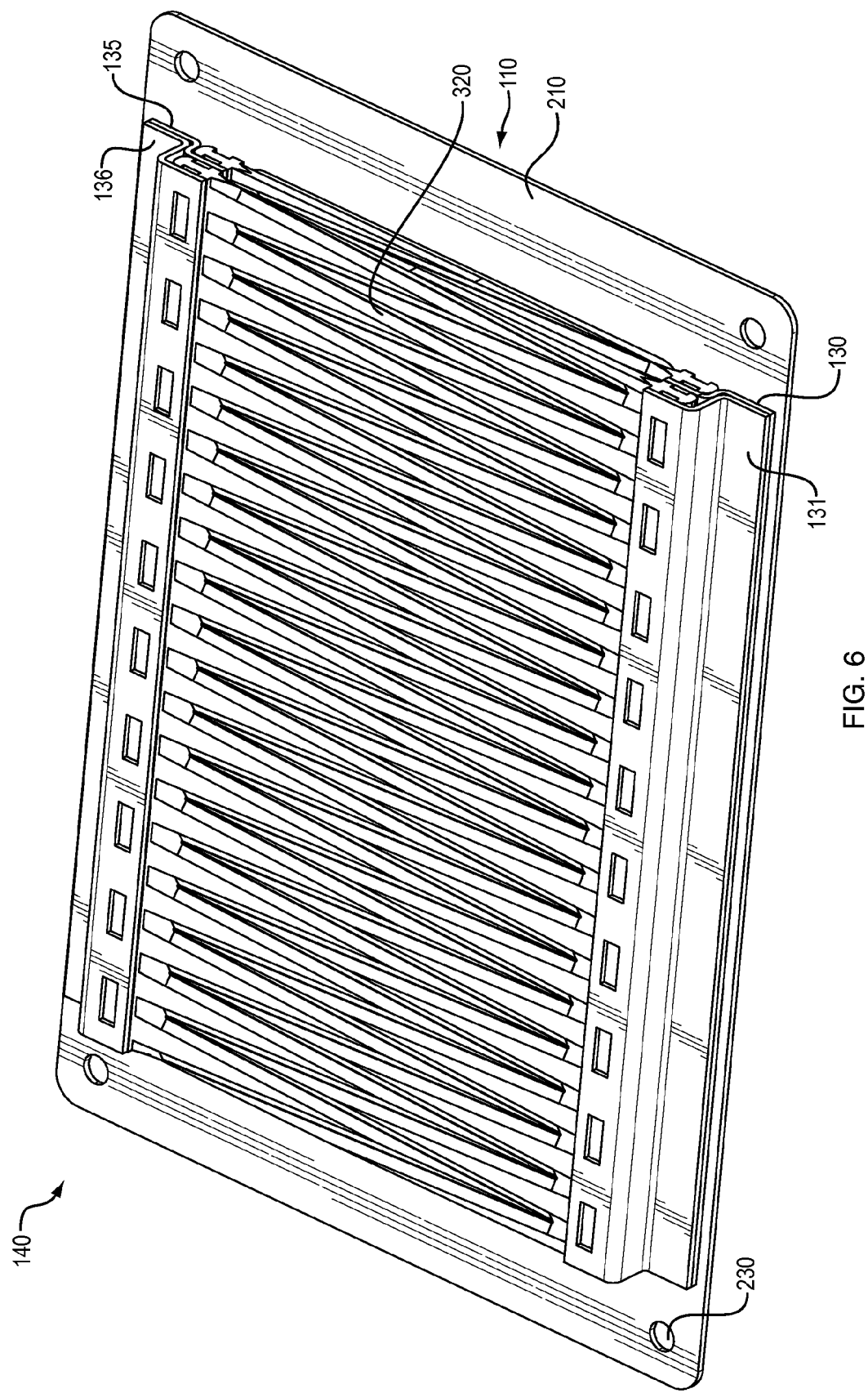
FIG. 6 is a bottom perspective view of the cable grommet of FIG. 5.

In a preferred embodiment, cable grommet 100 is assembled by sliding the support rib 310 of one molded finger assembly 120 into the support rib mounting channel 410 of one molded finger mounting flange 130, and coupling the top surface 430 of perimeter frame mounting section 420 to the underside of the perimeter frame 210, as shown in FIGS. 5 and 6. Molded finger mounting flange 135 is similarly assembled and coupled to the perimeter frame 210.

When assembled, the tips 370 of the molded fingers 320 in the first molded finger assembly 120 extend across at least the majority of the center opening 220 of floor tile mounting flange 110, toward the bases 340 of the molded fingers 320 in the second molded finger assembly 125. Similarly, the tips 370 of the molded fingers 320 in the second molded finger assembly 125 extend across at least the majority of the center opening 220 of the floor tile mounting flange 110, toward the bases 340 of the molded fingers 320 in the first molded finger assembly 120. This configuration of opposing, overlapping molded fingers provides an efficient air barrier that restricts the escape of cooling air from the under-floor ducts or plenums.

The cable grommet of the invention may be configured with more than one pair of opposed, overlapping molded finger assemblies. For example, cable grommet 140 of FIGS. 5 and 6 is configured with two pairs of opposed, overlapping molded finger assemblies: top molded finger assemblies 121 and 126, and bottom molded finger assemblies 122 and 127. Cable grommet 140 further comprises two pairs of molded finger mounting flanges: top molded finger mounting flanges 131 and 136, and bottom molded finger mounting flanges 132 and 137. Note that the bottom molded finger mounting flanges 132 and 137 are mounted to the top molded finger mounting flanges 131 and 136, respectively. Additional pairs of opposed, overlapping molded finger assemblies may be configured in the same manner, as shown by the dotted lines for the third set of molded finger assemblies 123 and 128 and molded finger mounting flanges 133 and 138 in FIG. 5. The thickness of the cable grommet is determined by the number of molded finger assemblies used in the configuration.

Figure 7:
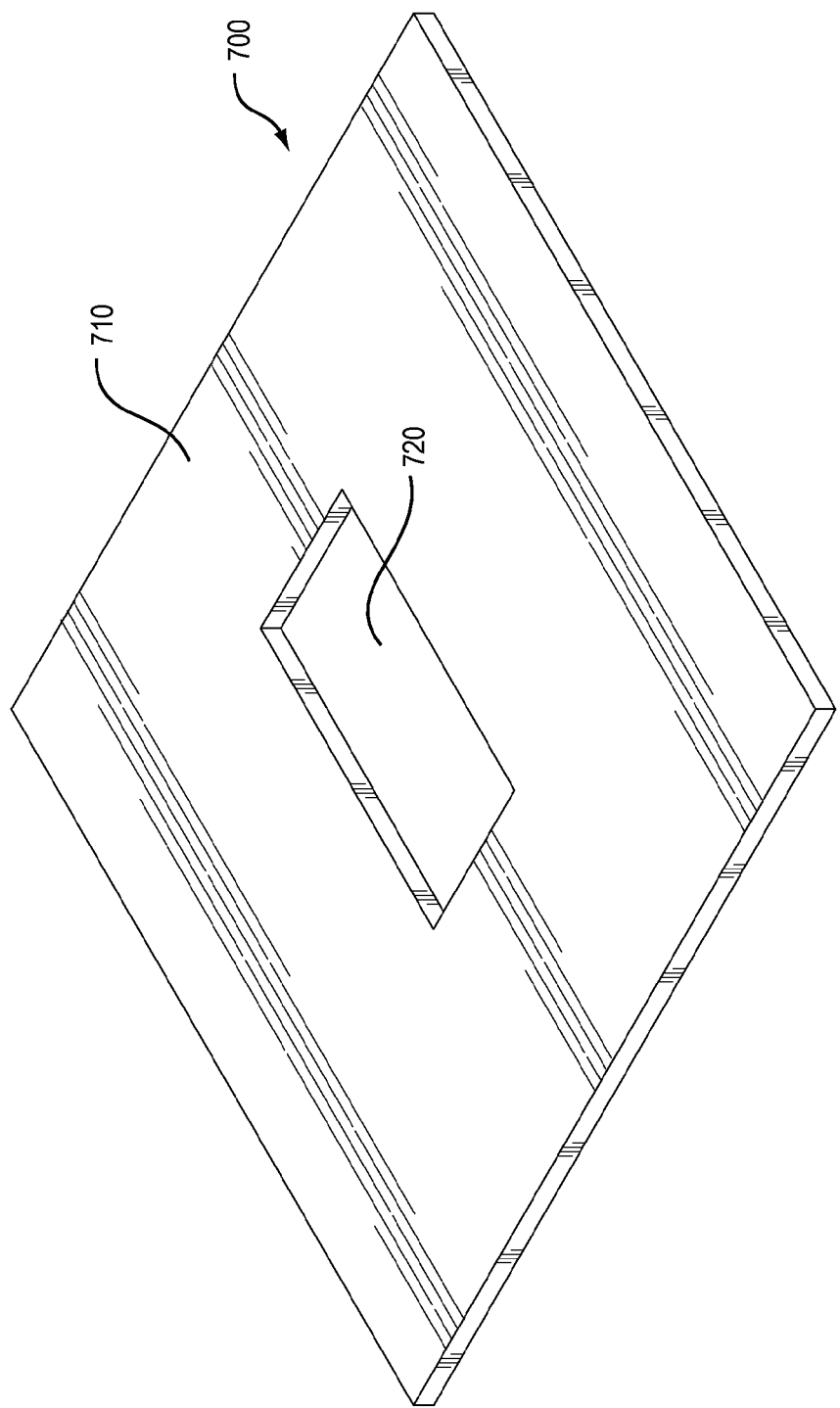
FIG. 7 is a top perspective view of a typical prior art raised floor tile.

As previously stated, cable grommet 100 is configured to be mounted within a prior art standard two-foot square raised floor tile, such as floor tile 700 of FIG. 7. Floor tile 700 is generally rectangular and defines a generally flat top surface 710 and a generally rectangular opening 720. Note that invention is not limited to any particular size or shape prior art floor tile.

Figure 8:
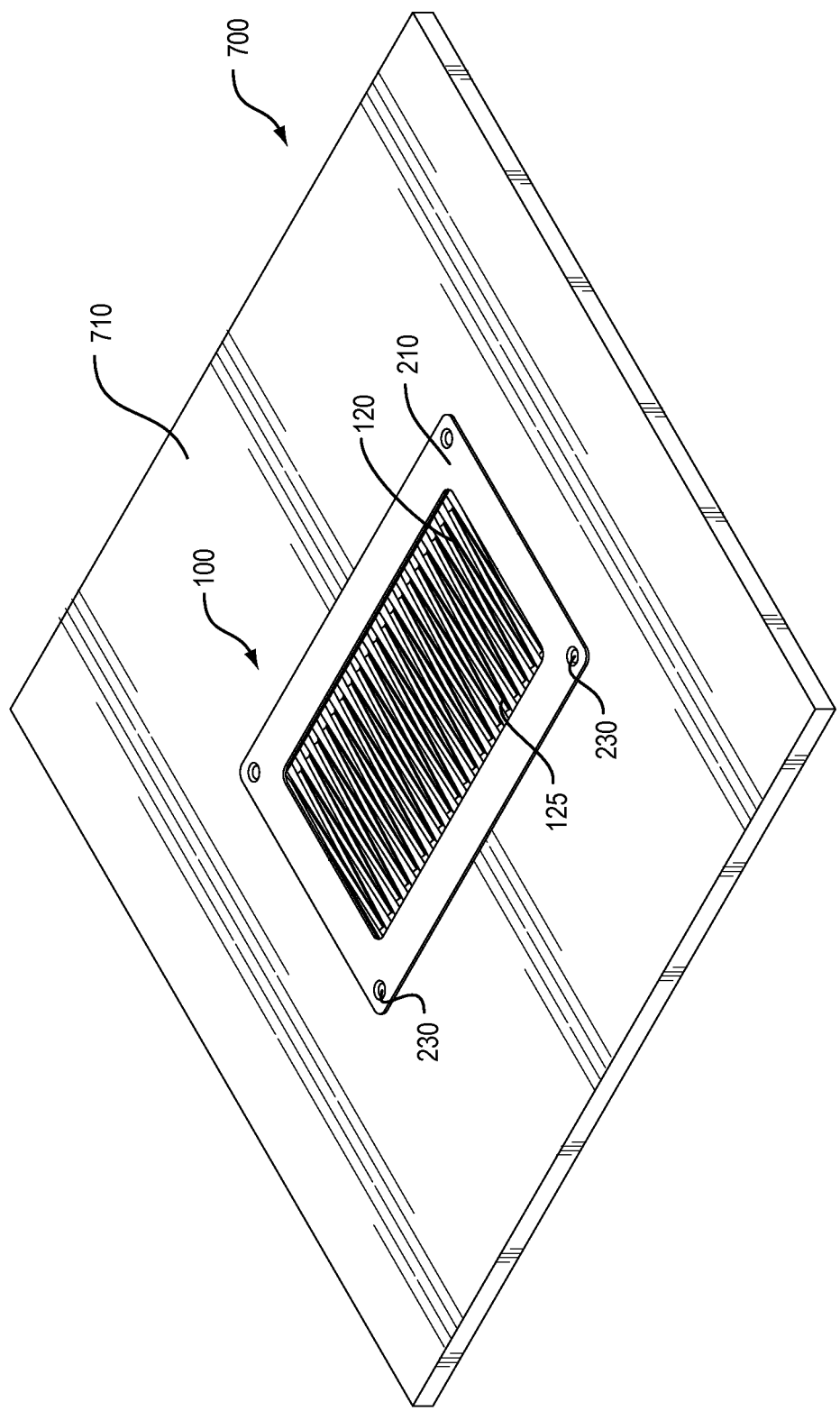
FIG. 8 is a top perspective view of the prior art raised floor tile of FIG. 7 with the cable grommet of FIG. 1 installed therein.

FIG. 8 shows a cable grommet 100 of the invention mounted within prior art floor tile 700. In a preferred embodiment, cable grommet 100 is sized and shaped such that at least a portion of perimeter frame 210 of floor tile mounting flange 110 rests along the top surface 710 of floor tile 700. Cable grommet 100 may be secured to floor tile 700 with screws at floor tile flange mounting holes 230, although other known methods for securing the cable grommet to the floor tile may be used. When in use, and as shown in FIG. 5, power and data cables, such as cable 730 (shown in dotted lines), may be routed under the raised floor and passed through the one or more pairs of opposed, overlapping molded finger assemblies. The sides 345 and 346 of the molded fingers 320 bend around the cables while the inner core section 330 remains generally rigid and lies generally in a plane that is essentially parallel to the plane of the floor, to restrict the escape of cooling air from under the floor.

Figure 9:
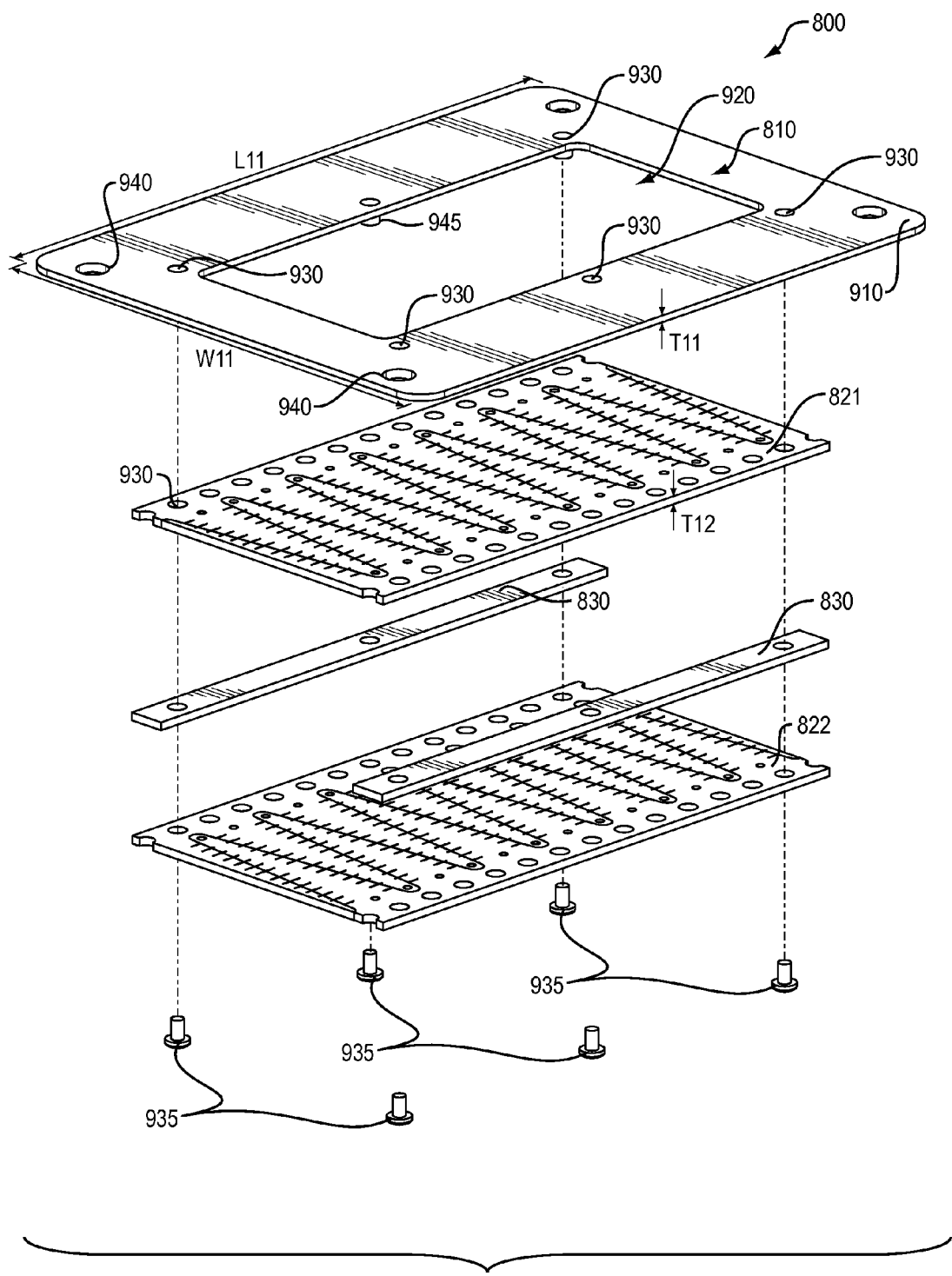
FIG. 9 is an exploded view of a third preferred embodiment of a cable grommet for use with a raised floor, constructed in accordance with the invention.
Figure 10:
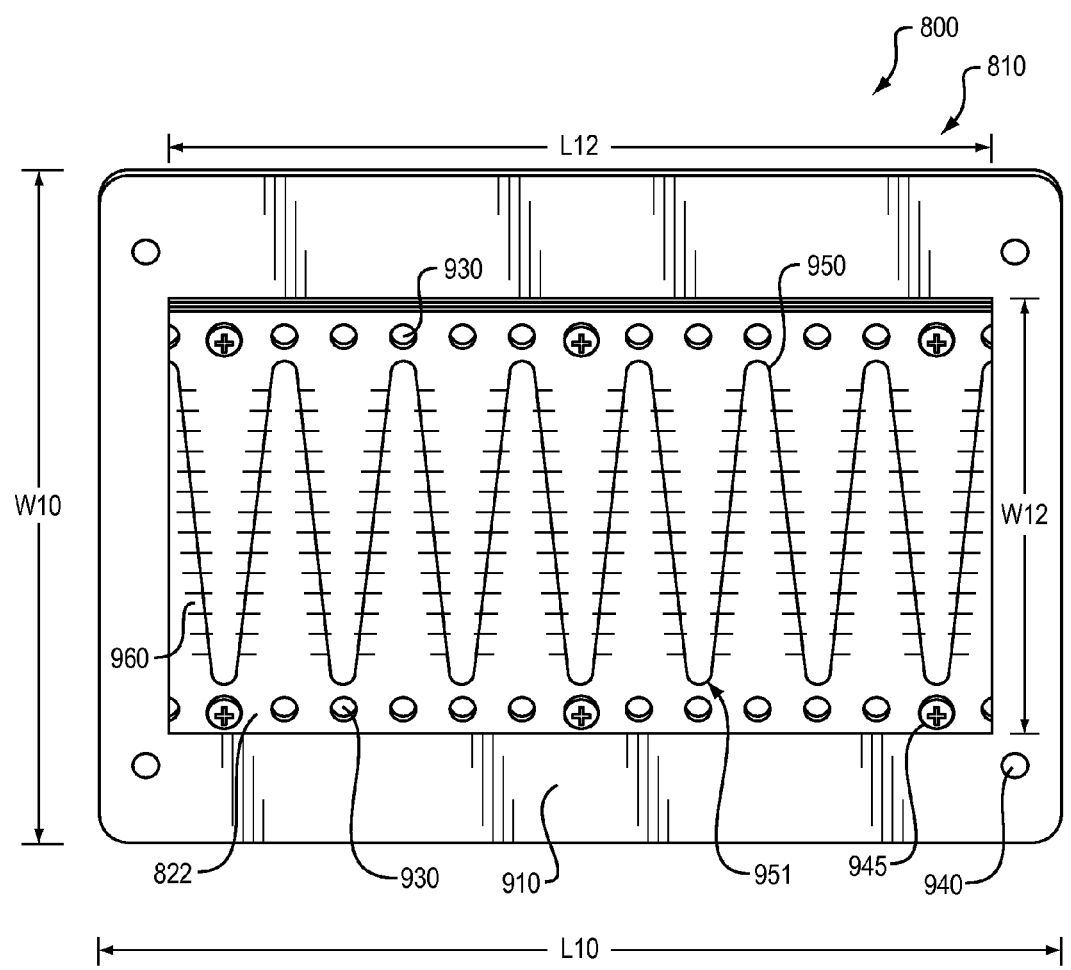
FIG. 10 is a bottom view of the cable grommet of FIG. 9.
Figure 12:
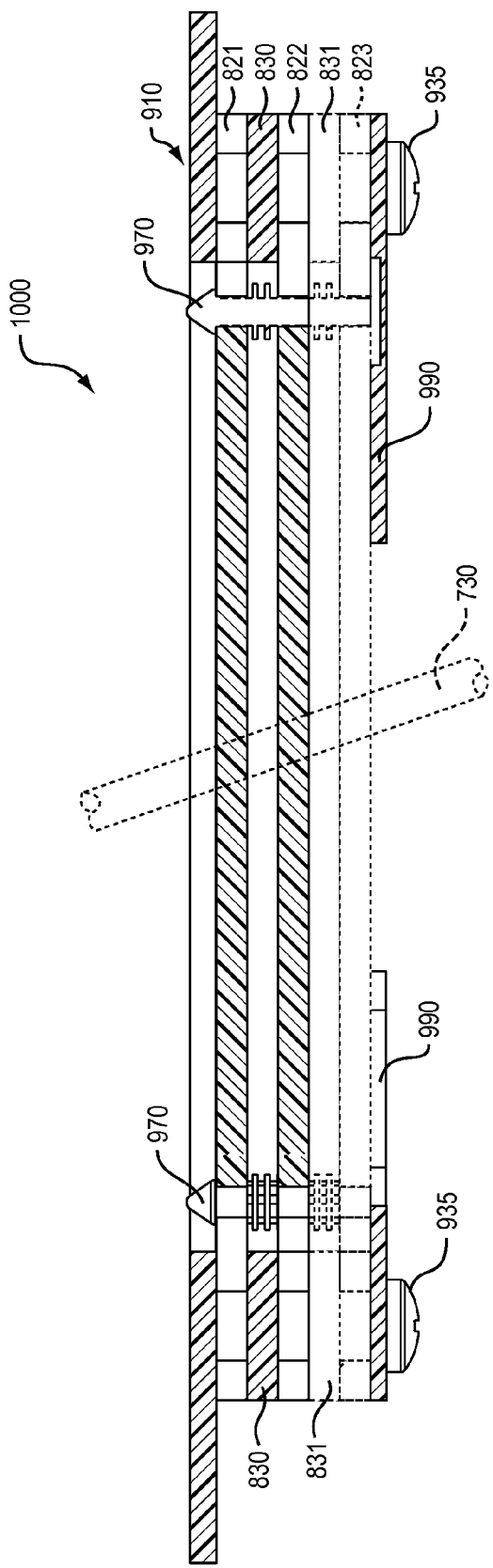
FIG. 12 is a cross-sectional view of a fourth preferred embodiment of a cable grommet for use with a raised floor, constructed in accordance with the invention.

An additional preferred embodiment of a cable grommet 800 is shown in FIGS. 9 and 10. Cable grommet 800 comprises a floor tile mounting flange 810, two die-cut finger panels 821 and 822, and a pair of elongated, generally rectangular finger panel spacers 830. Another preferred embodiment of a cable grommet 1000 is shown in FIG. 12. Cable grommet 1000 comprises three finger panels 821, 822 and 823, two pairs of finger panel spacers 830 and 831, and a pair of finger panel supports 990. The cable grommet of the invention is not limited to any particular number of finger panels, finger panel spacers, or finger panel supports.

In a preferred embodiment, cable grommet 800 is configured to be used with a standard two-foot square raised floor tile, as described below, with an approximate length $L10$ of 10.75 inches (27.3 centimeters) and an approximate width $W10$ of 8.25 inches (21 centimeters). The thickness of cable grommet 800 is dependent upon the number of finger panels, finger panel spacers, and finger panel supports employed in any specific configuration, as described in detail below. Note that the invention is not limited to any particular type or size of raised floor tile system.

Floor tile mounting flange 810 defines a generally rectangular perimeter frame 910, a generally rectangular opening 920, one or more finger panel mounting holes 930, and optionally, one or more floor tile mounting holes 940. In a preferred embodiment, for use with a standard two-foot square raised floor tile, floor tile mounting flange 810 has the same approximate length $L11$ and same approximate width $W11$, respectively, of cable grommet 800, and perimeter frame 910 has an approximate thickness $T11$ of 0.60 inches (1.5 centimeters). Perimeter frame 910 is preferably made of a hard plastic material, such as acrylonitrile-butadiene-styrene (ABS), polyvinyl chloride (PVC), PVC-SBS blends, or metals. Perimeter frame 210 may optionally be treated to be anti-static or flame-retardant.

Figure 11:
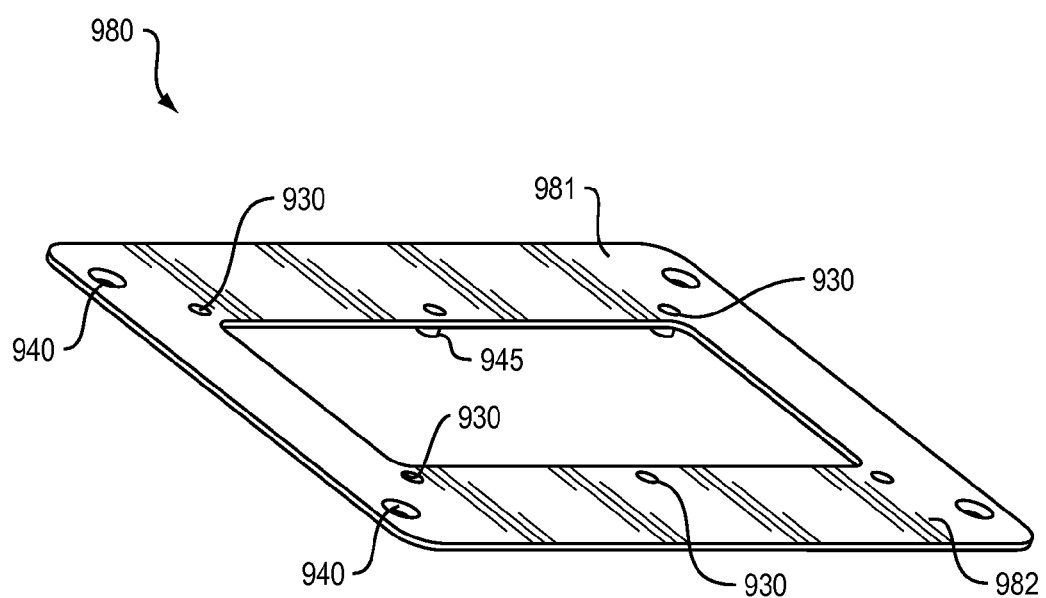
FIG. 11 is an alternative embodiment of the floor tile mounting flange of FIG. 9.

With reference to FIG. 11, in an alternative embodiment for use in a retrofit application where the floor tile is not removable or where under-floor access is limited, floor tile mounting flange 980 may be constructed in two approximately symmetrical halves 981 and 982.

In a preferred embodiment, each finger panel, such as finger panel 822, is generally rectangular with an approximate length $L12$ of 9.25 inches (23.5 centimeters), an approximate width $W12$ of 7.25 inches (18.4 centimeters), and an approximate thickness $T12$ of 0.60 inches (1.5 centimeters), and is made from a rigid polymer such as Santoprene™ with a Durometer rigidity or hardness value of approximately 80 A. The finger panels may optionally be treated to be anti-static or flame retardant. The finger panels are preferably mounted to the perimeter frame 910 of floor tile mounting flange 810, and optionally, to the finger panel spacers 830, with a plurality of finger panel mounting studs 945 and an equal number of finger panel mounting screws 935 inserted through finger panel mounting holes 930, although other known methods may be used.

In a preferred embodiment, finger panel 822 defines a generally sinusoidal cut 950 along its length that extends through the thickness of the finger panel 822. The sinusoidal cut 950 extends across at least the majority of the width of the finger panel 822, such that the peaks 951 of the sinusoidal cut 950 are proximate to, but not in contact with, the finger panel mounting holes 930. Finger panel 822 further defines a plurality of short cuts 960 that intersect with and run generally perpendicular to, sinusoidal cut 950. Short cuts 960 are spaced approximately 0.25 inches (0.60 centimeters) apart from each other along the width of finger panel 822. The short cuts 960 similarly extend through the thickness of the finger panel 822. The combination of the sinusoidal cut 950 and the short cuts 960 create openings for the passage of cables through the finger panel 822.

The cable grommet of the invention may be configured with one, two or more finger panels. For example, cable grommet 1000 of FIG. 12 is shown with optional third finger panel 823, shown in dotted lines, and optional second pair of finger panel spacers 831. Additional finger panels and finger panel spacers may be configured in the same manner, as required for a specific installation.

Figure 14A:
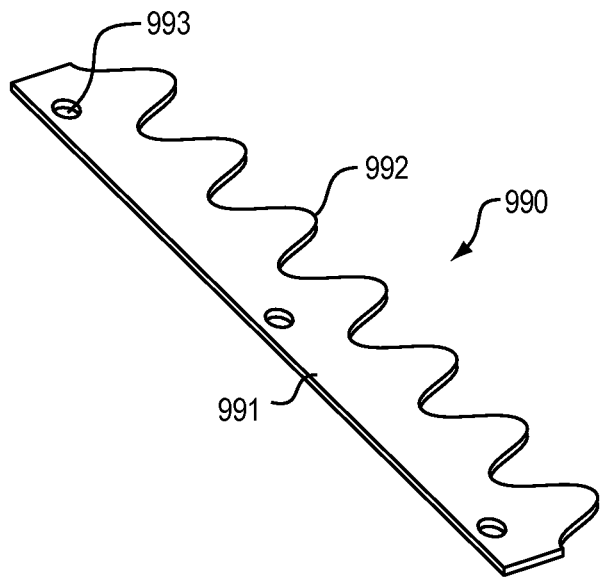
FIG. 14A is a perspective view of a finger panel support of the cable grommet of FIG. 12.
Figure 14B:
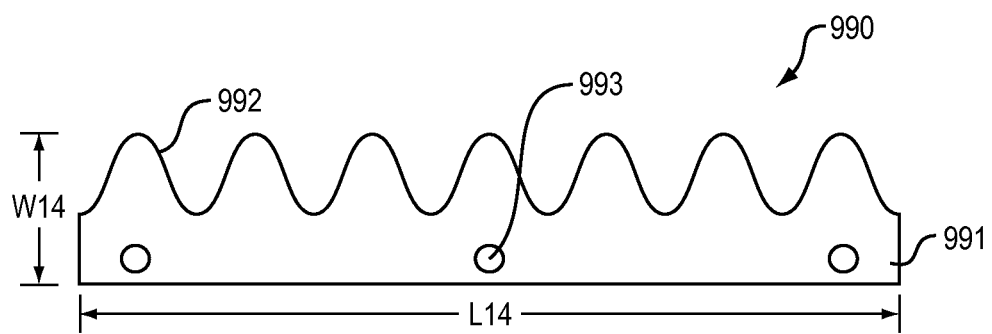
FIG. 14B is a top view of the finger panel support of FIG. 14A.

As shown in FIGS. 12, 14A and 14B, an optional pair of elongated finger panel supports 990 may be used to support the weight of the finger panels and to help prevent the fingers formed by the edges of the cuts 950 and 960 from sagging or falling. In a preferred embodiment, each finger panel support 990 defines a first essentially straight edge 991, an opposing edge 992 that defines a generally sinusoidal shape, and two or more finger panel spacer mounting holes 993. Finger panel supports 990 are preferably coupled to the finger panels by inserting the finger panel mounting screws 935 through the finger panel spacer mounting holes 993, although other known methods may be used.

In a preferred embodiment, the length L14 of finger panel support 990 is approximately the same as the length L12 of a finger panel 822, and the width W14 of finger panel support 990 is approximately one quarter of the width W12 of a finger panel 822. Finger panel support 990 if preferably made of a flexible yet rigid material, such as polycarbonate resin thermoplastic, for example, Lexan®.

The thickness of the cable grommet is determined by the number of finger panels, finger panel spacers, and finger panel supports used in a particular configuration.

As shown in FIG. 12, power and data cables may be routed under the raised floor and passed through the openings in the finger panels 821 and 822 (and optional finger panel 823) formed by the sinusoidal cut 950 and the short cuts 960. When a cable 730 (shown in dotted lines) is inserted through one of these openings the edges of the cuts form a plurality of fingers that bend around the cable, while the surrounding surface of the finger panel remains generally rigid and lies generally in a plane that is essentially parallel to the plane of the floor, restricting the escape of cooling air from under the floor.

Figure 13:
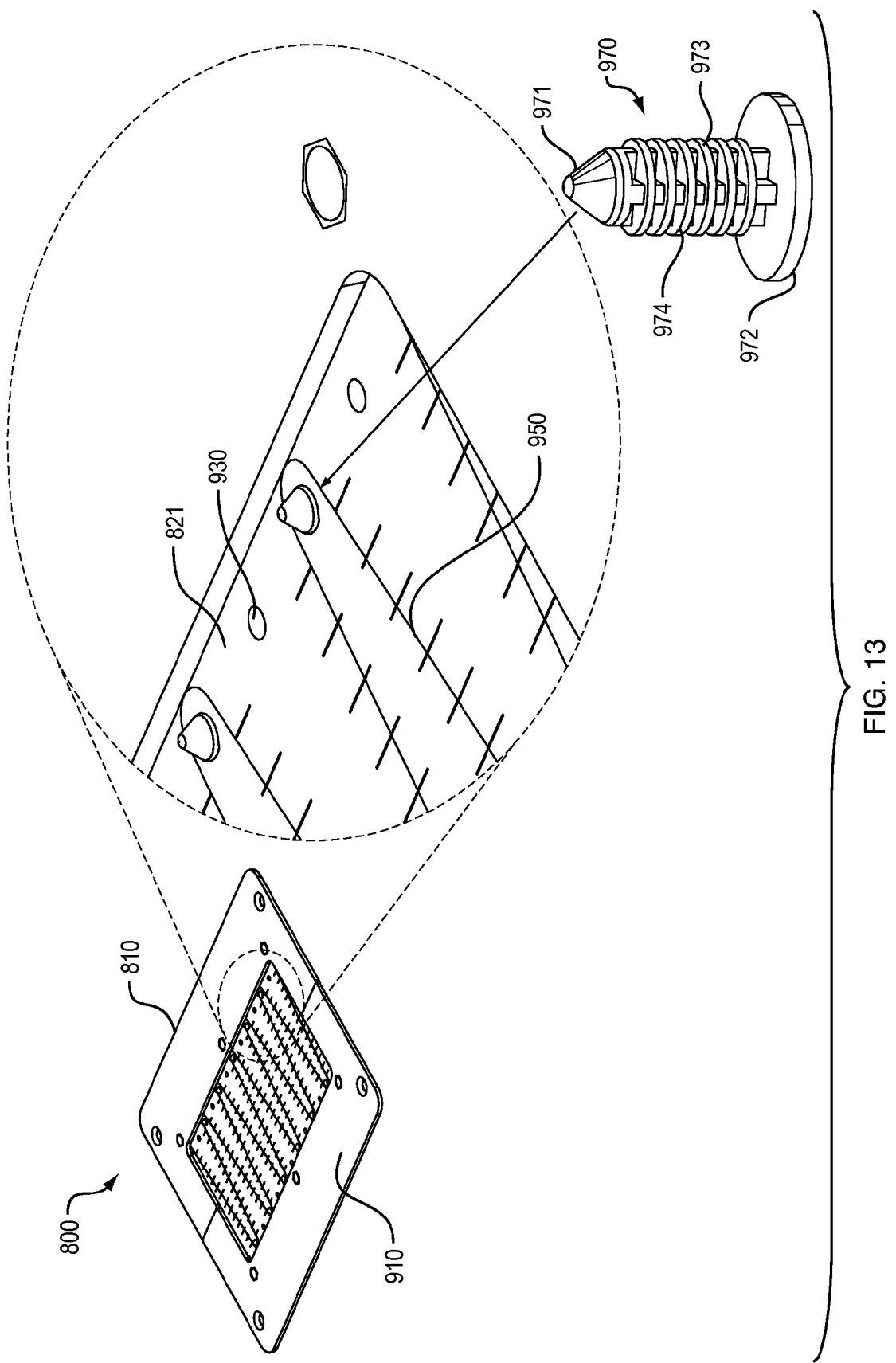
FIG. 13 illustrates the use of a retaining member with the finger panel of the cable grommet of FIG. 9.

As shown in FIGS. 12 and 13, retaining members 970 may be inserted through one or more of the finger panel mounting holes 930 to further secure the finger panels, particularly at its edges. In a preferred embodiment, retaining member 970 comprises a conical tip 971, a circular base with an essentially flat bottom 972, and a generally cylindrical center section 973. Center section 973 defines a plurality of ridges that are configured to hold the retaining member 970 in place.

When used, the finger panel spacers 830 increase the insulation gap between each pair of finger panels and improve the flexibility of the fingers. As shown in FIG. 9, the finger panel spacers 830 are coupled to the finger panels 821 and 822 along their lengths, proximate the outer edges, so as not to interfere with the passage of cables through the openings in the finger panels.

As with cable grommet 100, cable grommet 800 is sized and shaped such that at least a portion of perimeter frame 910 rests along the top surface 710 of art floor tile 700, shown in FIG. 7. Cable grommet 800 may be secured to floor tile 700 with screws at floor tile mounting holes 940, although other known methods for securing the cable grommet to the floor tile may be used.

What is claimed is:

1. A floor grommet, comprising:
a mounting flange comprising a perimeter frame, where the perimeter frame defines an opening;
first and second finger assemblies, the first finger assembly opposing the second finger assembly, where each finger assembly comprises a plurality of fingers, and each finger comprises a base portion and a tip portion;
first and second finger mounting flanges;
where the first finger mounting flange is coupled to the first finger assembly and further coupled to a first side of the perimeter frame;
where the second finger mounting flange is coupled to the second finger assembly and further coupled to an opposing second side of the perimeter frame;
each finger of the first finger assembly being disposed adjacent to a corresponding finger of the second finger assembly, each of the fingers in the first finger assembly extending across at least a majority of the opening along a length of the corresponding finger of the second finger assembly, and the tip portion of each finger of the first finger assembly being disposed in proximity to the base portions of the fingers in the second finger assembly, and
each finger of the second finger assembly being disposed adjacent to a corresponding finger of the first finger assembly, each of the fingers in the second finger assembly extending across at least a majority of the opening along a length of the corresponding finger of the first finger assembly, and the tip portion of each finger of the second finger assembly being disposed in proximity to the base portions of the fingers in the first finger assembly;
where each finger of the plurality of the fingers of the first finger assembly and the second finger assembly defines an inner core section and a pair of outer sections, where the outer sections together surround at least a part of the inner core section, the inner core section configured with a first material rigidity and each of the outer sections configured with a second material rigidity, the second material rigidity of each of the outer sections being less than the first material rigidity of the inner core section.

2. The floor grommet of claim 1, where the mounting flange comprises two approximately symmetrical halves.

3. The floor grommet of claim 1, where the plurality of the fingers of the first finger assembly and the second finger assembly define a generally triangular shape when viewed from the front.

4. The floor grommet of claim 1, where the cross-sectional area of the inner core section is smallest proximate the tip portion and largest proximate the base portion.

5. The floor grommet of claim 1, where the cross-sectional area of the outer section is largest proximate the tip portion and smallest proximate the base portion.

6. The floor grommet of claim 1, where the fingers in each of the finger assemblies are coupled at their base portions to an elongated support rib.

7. The floor grommet of claim 6, where each of the first finger mounting flange and the second finger mounting flange defines an elongated mounting channel sized and shaped to accommodate the elongated support rib.

8. The floor grommet of claim 1, where the first material rigidity of the inner core section comprises an inner core hardness value and the second material rigidity of each of the outer sections comprises an outer hardness value, the inner hardness value of the inner core section is greater than the outer hardness value of each of the outer sections.

9. The floor grommet of claim 1, further comprising:
third and fourth finger assemblies;
third and fourth finger mounting flanges;
where the third finger mounting flange is coupled to the third finger assembly and further coupled to the first finger mounting flange; and
where the fourth finger mounting flange is coupled to the fourth finger assembly and further coupled to the second finger mounting flange;
such that the tip portions of the fingers in the third finger assembly extend across at least a majority of the opening toward the base portions of the fingers in the fourth finger assembly, and the tip portions of the fingers in the fourth finger assembly extend across at least the majority of the opening toward the base portions of the fingers in the third finger assembly.

10. A floor grommet, comprising:
a mounting flange defining a perimeter frame and an opening; and
a finger panel coupled to the mounting flange, the finger panel extending across at least a majority of the opening;
where the finger panel defines a generally sinusoidal cut along its length, and where the sinusoidal cut extends through the thickness of the finger panel;
where the finger panel further defines a plurality of short cuts that intersect with and run generally perpendicular to the sinusoidal cut, and at least a majority of the short cuts extend through the thickness of the finger panel.

11. The floor grommet of claim 10, where the sinusoidal cut extends across at least a majority of a width of the finger panel.

12. The floor grommet of claim 10, further comprising a second finger panel coupled to the first finger panel.

13. The floor grommet of claim 10, further comprising a second finger panel and a pair of finger panel spacers, where the first finger panel is coupled to a first side of each of the finger panel spacers and the second finger panel is coupled to an opposing second side of each finger panel spacer.

14. The floor grommet of claim 10, where the mounting flange comprises two approximately symmetrical halves.

15. An assembly for use in a floor grommet, comprising:
an elongated support rib;
a plurality of fingers, where at least a majority of the fingers each comprise a base portion and a tip portion, and are coupled to the elongated support rib at their base portions, such that at least the majority of the fingers extend generally perpendicular to the support rib; and
where at least the majority of the fingers each define an inner core section and a pair of outer sections, where the outer sections together surround at least a part of the inner core section;
the inner core section configured with a first material rigidity and the outer sections configured with a second material rigidity, the second material rigidity of the outer sections being less than the first material rigidity of the inner core section.

16. The finger assembly of claim 15, where the cross-sectional area of the inner section is smallest proximate the tip portion and largest proximate the base portion, and where the cross-sectional area of the outer section is largest proximate the tip portion and smallest proximate the base portion.

17. A panel for use in a floor grommet, comprising:
a first generally rectangular panel defining a generally sinusoidal cut along its length, where the sinusoidal cut extends through the thickness of the panel, and further defining a plurality of short cuts that intersect with and run generally perpendicular to the sinusoidal cut, where at least a majority of the short cuts extend through the thickness of the finger panel.

18. The panel of claim 17, further comprising a second generally rectangular panel coupled to the first panel.

* * * * *